(12) United States Patent
Koleshwar et al.

(10) Patent No.: US 10,703,989 B2
(45) Date of Patent: Jul. 7, 2020

(54) CONSERVING FRESH WASH WATER USAGE IN DESALTING CRUDE OIL

(71) Applicant: Saudi Arabian Oil Company, Dhahran (SA)

(72) Inventors: Vilas S. Koleshwar, Dhahran (SA); Saif F. Albluwi, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 132 days.

(21) Appl. No.: 15/719,884

(22) Filed: Sep. 29, 2017

(65) Prior Publication Data
US 2019/0100703 A1    Apr. 4, 2019

(51) Int. Cl.
| | |
|---|---|
| *C10G 33/06* | (2006.01) |
| *C10G 31/08* | (2006.01) |
| *B01D 17/04* | (2006.01) |
| *B01D 17/06* | (2006.01) |
| *C10G 31/11* | (2006.01) |
| *C10G 33/00* | (2006.01) |
| *C10G 53/08* | (2006.01) |

(52) U.S. Cl.
CPC ............ *C10G 33/06* (2013.01); *B01D 17/04* (2013.01); *B01D 17/047* (2013.01); *B01D 17/06* (2013.01); *C10G 31/08* (2013.01); *C10G 31/11* (2013.01); *C10G 33/00* (2013.01); *C10G 53/08* (2013.01); *C10G 2300/1033* (2013.01); *C10G 2300/203* (2013.01); *C10G 2300/205* (2013.01); *C10G 2300/208* (2013.01)

(58) Field of Classification Search
None
See application file for complete search history.

(56) References Cited

U.S. PATENT DOCUMENTS

| | | |
|---|---|---|
| 4,684,457 A | 8/1987 | McKechnie et al. |
| 4,722,781 A | 2/1988 | Swartz et al. |
| 5,271,841 A | 12/1993 | Hart |

(Continued)

FOREIGN PATENT DOCUMENTS

WO    WO0174468 A2    10/2001

OTHER PUBLICATIONS

Pak, A. Wastewater treatment of desalting units, 2005, Desalination, vol. 22, pp. 249-254 (Year: 2005).*

(Continued)

*Primary Examiner* — Derek N Mueller
(74) *Attorney, Agent, or Firm* — Fish & Richardson P.C.

(57) ABSTRACT

Methods for conserving the use of fresh wash water in crude oil desalting are described. A crude oil stream including salt mixes with a wash water stream to form an emulsion. The emulsion flows to a desalter, and the wash water coalesces to reform the wash water stream and to transfer at least a portion of the salt from the crude oil stream to the wash water stream. The crude oil stream with reduced salt content separates from the wash water stream. The effluent, which includes the wash water stream, flows from the desalter to a processing unit. The effluent is processed to reduce a concentration of salt in the effluent to be substantially equal to or less than a concentration of salt in the wash water stream. At least a portion of the processed effluent mixes with the crude oil stream before the emulsion flows to the desalter.

20 Claims, 7 Drawing Sheets

(56) References Cited

U.S. PATENT DOCUMENTS

| | | | |
|---|---|---|---|
| 6,159,374 A | 12/2000 | Hart | |
| 7,282,152 B2* | 10/2007 | Dubrovsky | C02F 1/26 210/660 |
| 2014/0008271 A1 | 1/2014 | Moene et al. | |
| 2015/0152340 A1 | 6/2015 | Cherney et al. | |
| 2015/0218027 A1* | 8/2015 | Nicolazzi | C02F 9/00 95/259 |
| 2016/0297692 A1 | 10/2016 | Baeuerle | |

OTHER PUBLICATIONS

International Search Report and Written Opinion issued in International Application No. PCT/US2018/053047 dated Dec. 13, 2018, 14 pages.

\* cited by examiner

US 10,703,989 B2

CONSERVING FRESH WASH WATER USAGE IN DESALTING CRUDE OIL

TECHNICAL FIELD

This specification relates to desalting crude oil, for example, in crude oil production facilities and crude oil refineries.

BACKGROUND

Crude oil produced from a reservoir can contain various impurities, such as sand, salts, drilling mud, corrosion byproducts, and debris. Calcium, sodium, and magnesium chlorides are some common salts that can be present in crude oil. The amount of salt content in crude oil can vary depending on the source of crude oil. The salt in crude oil is typically not carried by the crude oil itself; rather, the salt is dissolved in water droplets that are dispersed in the crude oil. In some cases, crude oil can contain crystalline salt which can form due to changes in temperature and pressure. These salts can cause problems in production and refining. For example, the presence of salts can result in solid precipitation and formation of scale on process equipment. The presence of salt in water can also accelerate corrosion in piping and equipment. When salts are dissolved in water, high temperatures in processing units can potentially cause water hydrolysis, which can allow the formation of corrosive hydrochloric acid. Salt components can also poison catalysts in downstream processes. For at least these reasons, crude oil undergoes a desalting process to reduce the salt content of the crude oil to acceptable levels.

SUMMARY

The present specification describes technologies relating to conserving the use of fresh wash water in crude oil desalting.

Certain aspects of the subject matter described here can be implemented as a method. A crude oil stream which includes salt is mixed with a wash water stream to form an emulsion of wash water in crude oil. The emulsion is flowed to a desalter, and in the desalter, the wash water is coalesced to reform the wash water stream and to transfer at least a portion of the salt from the crude oil stream to the wash water stream. In the desalter, the crude oil stream with reduced salt content is separated from the wash water stream, to which at least the portion of the salt is transferred. The effluent, which includes the wash water stream to which at least the portion of salt is transferred, is flowed from the desalter to a processing unit. In the processing unit, the effluent is processed to reduce a concentration of salt in the effluent to be substantially equal to or less than a concentration of salt in the wash water stream. At least a portion of the processed effluent is mixed with the crude oil stream before the emulsion is flowed to the desalter.

This, and other aspects, can include one or more of the following features. Mixing the crude oil stream with the wash water stream can include flowing the crude oil stream in a crude oil flowline to the desalter and flowing the wash water stream in a wash water flowline to the crude oil flowline before the desalter.

Mixing at least the portion of the processed effluent with the crude oil stream can include flowing an effluent stream from the processing unit to the crude oil flowline before the desalter.

Mixing at least the portion of the processed effluent with the crude oil stream can include flowing an effluent stream from the processing unit to the wash water flowline before mixing the crude oil stream with the wash water stream.

The effluent can include crude oil, and processing the effluent can include deoiling the effluent to remove at least a portion of the crude oil from the effluent and desalinating the effluent to reduce the concentration of salt in the effluent.

Desalinating the effluent to reduce the concentration of salt in the effluent can include performing reverse osmosis or an evaporation and condensation process on the effluent.

The reverse osmosis can be performed at a temperature of substantially 60° C.

Deoiling the effluent to remove at least the portion of the crude oil from the effluent can include flowing the effluent to a gravity separator, a cyclone separator, an induced gas floatation tank, an ultrafiltration unit, or a combination of these; separating at least the portion of the crude oil in the effluent from a remainder of the effluent; and mixing the separated portion of the crude oil with the crude oil stream before flowing the emulsion to the desalter.

The effluent can include dissolved acid gas, and deoiling the effluent can include stripping the effluent to remove at least a portion of the dissolved acid gas.

The effluent can include dissolved organics, and deoiling the effluent can include adsorbing at least a portion of the dissolved organics from the effluent on a macro-porous resin.

At least the portion of the dissolved organics can be adsorbed on the macro-porous resin at a temperature of substantially 60° C.

Certain aspects of the subject matter described here can be implemented as a method. A mixture of a crude oil stream, which includes salt, and a wash water stream is flowed to a desalter. In the desalter, a quantity of salt in the crude oil stream is reduced, a quantity of salt in the wash water stream is increased, and the crude oil stream with reduced salt content is separated from the wash water stream with increased salt content. An effluent, which includes the wash water stream with increased salt content, is flowed to a processing unit. In the processing unit, the effluent is deoiled to remove at least a portion of crude oil from the effluent, and after the deoiling, the effluent is desalinated to reduce a quantity of salt in the effluent. At least a portion of the processed effluent from the processing unit is mixed with the crude oil stream before flowing the mixture of the crude oil stream and the wash water stream to the desalter.

This, and other aspects, can include one or more of the following features. The crude oil stream can be mixed with the wash water stream before flowing the mixture of the crude oil stream and the wash water stream to the desalter.

Mixing the crude oil stream with the wash water stream can include flowing the crude oil stream in a crude oil flowline to the desalter and flowing the wash water stream in a wash water flowline to the crude oil flowline before the desalter.

Mixing at least the portion of the processed effluent from the processing unit with the crude oil stream can include flowing an effluent stream from the processing unit to the wash water flowline before mixing the crude oil stream with the wash water stream.

Mixing at least the portion of the processed effluent from the processing unit with the crude oil stream can include flowing an effluent stream from the processing unit to the crude oil flowline before the desalter.

The effluent can include crude oil, suspended solids, hydrogen sulfide, and dissolved organics, and deoiling the effluent can include ultrafiltering, separation, induced gas floatation, or a combination of these to remove at least a portion of the crude oil and at least a portion of the suspended solids from the effluent. Deoiling the effluent can also include stripping the effluent to remove at least a portion of the dissolved hydrogen sulfide from the effluent and adsorbing at least a portion of the dissolved organics from the effluent on a macro-porous resin.

The removed portion of the crude oil from the effluent can be mixed with the crude oil stream before mixing the crude oil stream with the wash water stream.

Desalinating the effluent can include performing reverse osmosis or an evaporation and condensation process on the effluent.

The reverse osmosis can be performed at a temperature of substantially 60° C.

The details of one or more implementations of the subject matter of this specification are set forth in the accompanying drawings and the description. Other features, aspects, and advantages of the subject matter will become apparent from the description, the drawings, and the claims.

DETAILED DESCRIPTION

Figure 1A:
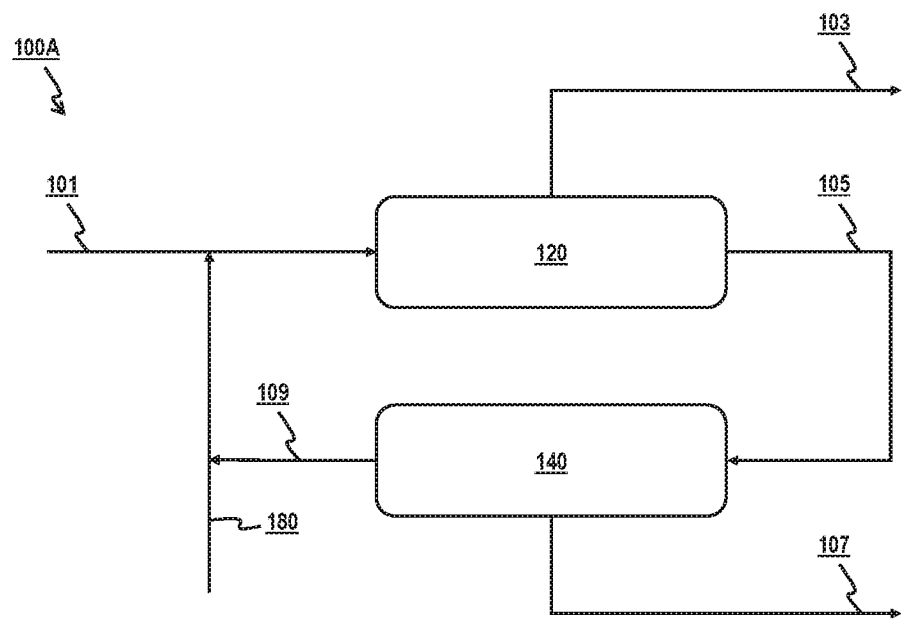
FIG. 1A is a diagram of an example of a crude oil desalting system, according to the disclosure.

The crude oil desalting process typically utilizes a large amount of wash water (for example, 3 percent (%) to 5% water to dry crude oil volume ratio) to mix with the crude oil in order to provide enough water to dilute the high salinity residual water and to provide enough dispersion to dissolve any crystalline salts that may be present. For example, a worldwide crude oil production rate of 90 million barrels per day (bpd) can potentially require an estimated 2.7 to 4.5 million bpd of wash water, just for mixing with the crude oil for desalting purposes. The wash water can come from various sources of water, such as a low salinity underground aquifer, a high salinity underground aquifer, desalinated seawater, desalinated groundwater, or surface water from rivers or lakes. Groundwater can be an especially valuable resource in areas of the world with large desert topographies.

Effluent water from the crude oil desalting process is typically routed to conventional produced water treatment plants, where the effluent can be de-oiled and can be disposed of by subsurface re-injection for reservoir pressure maintenance, downhole disposal, or marine discharge. This disclosure describes technologies relating to treating the effluent water from the crude oil desalting process and recycling the treated effluent water back to the desalting process as wash water, so that the usage of make-up or fresh wash water can be significantly reduced. Make-up or fresh wash water means wash water from any source of water, previously unused for the desalting process (or in other words, used for the first time in the desalting process), in contrast to the treated effluent which has already been through the desalting process and is recycled as wash water. In certain implementations, the treated effluent water can have a salinity—for example, 750 parts per million (ppm)—that is lower than the salinity of a source of groundwater—for example, 2,000 ppm—and can lead to an at least 70% reduction in usage of groundwater for the associated desalting process.

By implementing the techniques described here, fresh wash water use in the desalting process can be reduced, which can be especially desirable in areas of the world where sources of wash water, such as groundwater, are scarce. Wastewater production from the desalting process can be reduced, which can reduce the load and costs of wastewater treatment processes. The desalting process performance can be improved by treating the desalter effluent to have a lower salt content in comparison to the makeup source of wash water, such as groundwater. Wash water quality can be controlled, thereby helping to maintain and improve desalting performance, which can be sensitive to fluctuations or variations of wash water quality. In some cases, available fresh wash water sources have poor quality (for example, high contamination or salinity), which can lead to operational challenges to maintain a desired crude oil quality out of the desalter. In such cases, the techniques described can be used to reduce the usage of fresh wash water (of poor quality) by generating high quality wash water from the desalter effluent, thereby improving desalter performance and maintenance of on-specification crude oil.

Referring to FIG. 1A, a desalting system 100A can include a desalter 120 and a processing unit 140 that treats a desalter effluent 105 from the desalter 120. A crude oil stream 101, which includes salt, mixes with a fresh wash water stream 180 and flows to a desalter 120. The crude oil stream with salt 101 can have been processed prior to flowing to the desalting system 100A. For example, the crude oil stream with salt 101 can be a resultant stream downstream of various processes for processing crude oil, such as phase separation (of gas, oil, and water), crude oil heating, and crude oil dehydration.

The crude oil stream 101 includes brine (that is, water with dissolved salt) droplets dispersed in the crude oil. The fresh wash water stream 180 can be introduced to (that is, mixed with) the crude oil stream 101, so that the wash water can combine with the water droplets already dispersed in the crude oil, thereby diluting the salt concentration. The fresh wash water stream 180 has a lower salt content than formation water (that is, water that naturally occurs in the rock formation and may be produced during hydrocarbon recovery) or brine in the crude oil stream 101. Fresh wash water is typically not salt-free and can have a high level of total dissolved solids (TDS), for example, 10,000 to 15,000 ppm, which is typical of aquifer water.

Wash water quality for desalting processes is a key process consideration that not only affects desalter operation, but also downstream processes. For example, poor wash water quality can result in off-specification crude quality exiting the desalting process (for example, salt content higher than 10 pounds of salt per thousand barrels of crude oil), which in turn can lead to fouling, coking, and plugging of various downstream equipment, such as heat exchangers, furnaces, and fractionators. Wash water has very low (or zero) concentrations of oxygen, ammonia, suspended solids, dissolved salts (which translates to total hardness of the wash water), soluble organics, and hydrogen sulfide. For example, wash water can have concentrations of 1 to 5 ppm of suspended solids, 100 to 1,000 ppm of dissolved salts, 1 to 5 ppm of soluble organics, and 0.2 ppm of hydrogen sulfide. Wash water can have a potential of hydrogen (pH), such that the desalter effluent has a pH between 5.5 and 7.0. A high pH of wash water can cause iron sulfide to precipitate, which is undesirable, as the solid iron sulfide particles can stabilize emulsions in the desalter 120 and cause excessive water carryover with the crude oil, excessive oil carryover with the desalter effluent, or both.

The mixture of the fresh wash water stream 180 and the crude oil stream 101 flows to the desalter 120, where the crude oil can be separated from the wash water, which includes the salt that was originally dissolved in the water droplets dispersed in the crude oil before the mixing of the fresh wash water stream 180 and the crude oil stream 101. In certain implementations, the mixture of the crude oil stream 101 and the fresh wash water stream 180 is an emulsion of water in crude oil (that is, a mixture including wash water droplets dispersed in crude oil). In the desalter 120, the salt in the crude oil stream 101 can be diluted using the fresh wash water stream 180. In the desalter 120, the water droplets of the emulsion coalesce (that is, come together or combine into a mass or a whole) and separate out to carry salt away from the crude oil. The desalter 120 can utilize any emulsion treatment technique to cause the water droplets in the crude oil to coalesce.

In the desalter 120, the crude oil with reduced salt content can be separated from the water in which at least the portion of the salt from the crude oil stream 101 is dissolved. Salt that was originally dissolved in water droplets dispersed in the crude oil stream 101 can be transferred to the wash water in the wash water stream 180, as the wash water mixes and coalesces with the water droplets which were originally dispersed in the crude oil stream 101, then the wash water (now with an increased salt concentration) and the crude oil (now with a decreased salt concentration) can be separated from each other in the desalter 120. The breaking of a crude oil emulsion into oil and water phases is also referred to as demulsification. Because water has a higher density than crude oil, the water tends to settle in comparison to the crude oil. In other words, in the desalter 120, the water will tend to form a layer at the bottom of the desalter, and the crude oil will tend to form a layer at the top of the desalter. The rate at which water droplets dispersed in the crude oil settles in the desalter 120 can be defined by Stokes' Law, as shown in the following equation:

$$V = 8.3 \times 10^5 \frac{SG_{water} - SG_{oil}}{\mu} d^2 \qquad (1)$$

where $SG_{water}$ is the specific gravity of wash water, $SG_{oil}$ is the specific gravity of crude oil, d is the diameter of a droplet of wash water, and V is the settling velocity of the droplet of wash water. Therefore, large differences in density can result in increased settling velocity, which favors demulsification. In some cases, viscosity of the crude oil decreases as temperature increases. Low viscosity of crude oil in the desalter 120 can favor demulsification. Therefore, in certain implementations, operating temperature of the desalter 120 can be elevated, and the operating pressure of the desalter 120 can be sufficiently high to maintain the crude oil in a liquid phase (that is, prevent the crude oil from vaporizing as temperature is elevated).

As seen in Equation 1, settling velocity increases as water droplet diameter increases (in other words, demulsification improves with increased droplet diameter). Coalescence of the water droplets can form water droplets of larger size (and therefore, diameter). In certain implementations, an electrical (also referred to as electrostatic) field can be applied to the desalter 120 to accelerate the coalescence of water droplets in the desalter 120. The electrostatic field can induce dipole attractive forces between nearby droplets of water in the crude oil. In other words, the electrostatic field can cause each water droplet to have a positive charge on one side and a negative charge on the other, which can cause the water droplets to coalesce due to the attractive force of opposite charges on neighboring droplets induced by the electric field. A voltage gradient of the electrical field can be adjusted to aid coalescence of water droplets. The attractive force between water droplets dispersed in oil can be described by the following equation:

$$F = K \frac{E^2 r^6}{a^4} \qquad (2)$$

where K is the dielectric constant of oil, E is the voltage gradient, r is the radius of a water droplet, and a is the distance between two water droplets. As seen in Equation 2, droplet size impacts the attractive force (and therefore, rate of coalescence of the droplets). As droplet size increases, the attractive force between droplets increases. As droplets get closer together (that is, the distance between droplets gets shorter), the attractive force between droplets increases. In some cases, increasing the voltage gradient applied across the desalter 120 does not compensate for large distances between water droplets as a result of low water content in the crude oil. In such cases, increasing the amount of water dispersed in the crude oil can make a larger impact than increasing the voltage gradient applied across the desalter 120.

In certain implementations, surfactants (that is, material that migrates to oil-water interfaces) surround the water droplets dispersed in the crude oil. Typically, surfactants include hydrophobic material (that is, material with low affinity to water) and hydrophilic material (that is, material with high affinity to water), and the surfactant aligns around water droplets, such that the hydrophilic material is close to the water, and the hydrophobic material is close to the oil. Surfactants can include cationic (overall positive electrical charge), anionic (overall negative electrical charge), or neutral (overall, net zero charge) tails. The presence of surfactants can inhibit contact between water droplets. In other words, surfactants can hinder coalescence of the water droplets. In such cases, additives, such as demulsifying chemicals can be introduced to remove any surfactants, in order to aid coalescence of the water droplets.

In the desalter 120, the crude oil with reduced salt content can be separated from the wash water to which salt has been transferred (that is, the wash water with increased salt content). The separated crude oil with reduced salt content 103 can, for example, flow from the desalter 120 to another downstream process or a pipeline for transportation to another facility. The desalter effluent 105 (which includes the wash water, salt from the crude oil stream 101, and in some cases, traces of oil from the crude oil stream 101) from the desalter 120 can flow to a processing unit 140. Processing the desalter effluent 105 in the processing unit 140 can reduce a concentration of salt in the desalter effluent 105 to be substantially equal to or less than a concentration of salt in the fresh wash water stream 180. In this specification, "substantially" means a deviation or allowance of up to 20%. For example, the fresh wash water stream 180 can have a salt concentration of substantially 2,000 ppm, and processing the desalter effluent 105 in the processing unit 140 can reduce the salt concentration of the desalter effluent 105 to within a range of 700 ppm to 1,700 ppm. The processing unit 140 can include various techniques to clean the desalter effluent 105—that is, remove impurities such as solids, dissolved gases, entrained crude oil, or dissolved salts. The various techniques to clean the desalter effluent 105 can include, for example, ultrafiltration, stripping, adsorption, reverse osmosis, evaporation and condensation-based purification, humidification and dehumidification-based purification, or a combination thereof. The removed impurities from the desalter effluent 105 can flow from the processing unit 140 (for example, the brine stream 107) to another downstream process or be disposed. In certain implementations, the impurities can flow as separate streams from the processing unit 140, for example, a brine stream and an oily stream. A salt balance across the processing unit 140 can be performed, where the salt content in the desalter effluent 105, the brine stream 107, and the processed effluent 109 are measured and adjusted to attain a desired salt content in the processed effluent 109.

The following table example salt concentrations in milligrams per liter (mg/L) of the desalter effluent 105 (upstream of the processing unit 140) and the processed effluent 109 (downstream of the processing unit 140), which were measured during various pilot tests.

| Test number | Desalter effluent 105 salt concentration (mg/L) | Processed effluent 109 salt concentration (mg/L) |
|---|---|---|
| 1 | 10,364 | 1,106 |
| 2 | 12,377 | 1,440 |
| 3 | 6,340 | 725 |
| 4 | 7,421 | 400 |
| 5 | 9,500 | 690 |
| 6 | 8,250 | 430 |

Another parameter to consider is recovery of wash water, which can be calculated as the ratio of treated effluent (exiting the processing unit 140 to be recycled as wash water) to desalter effluent (to be fed to the processing unit 140). In a pilot test, the average recovery of fresh water was substantially 70% with deviation in a range of 60% to 80%.

Figure 1B:
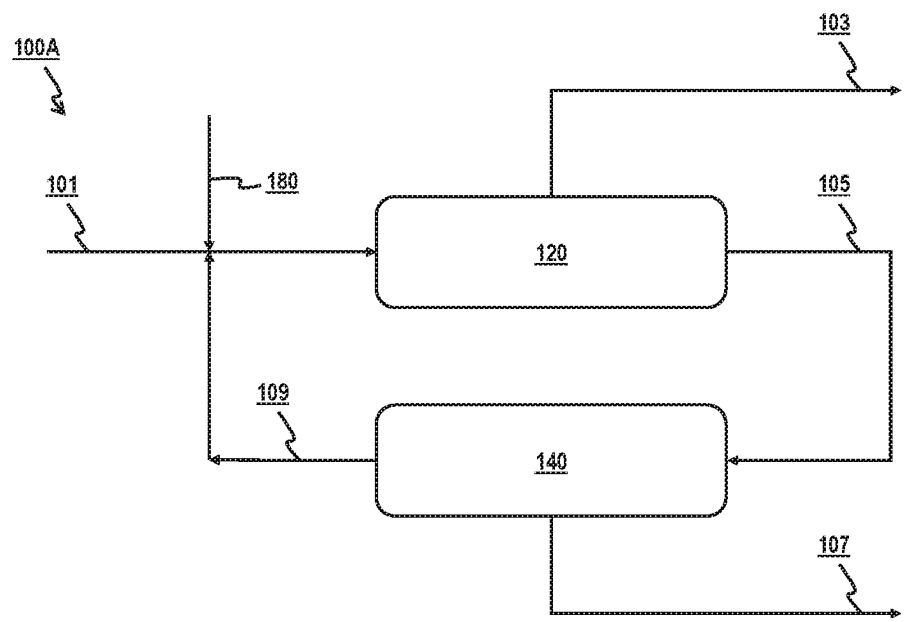
FIG. 1B is a diagram of an example of the crude oil desalting system of FIG. 1A, which includes mixing processed effluent with crude oil at another point.
Figure 1C:
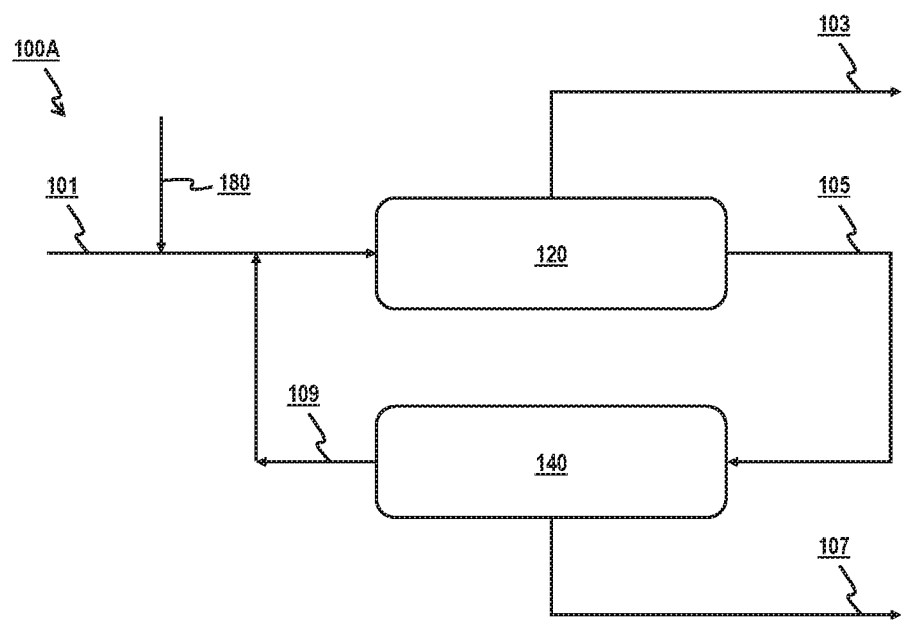
FIG. 1C is a diagram of an example of the crude oil desalting system of FIG. 1A, which includes mixing processed effluent with crude oil at another point.

The processed effluent 109 is water with low levels of contaminants (such as salt or TDS). The processed effluent 109, which can have a concentration of salt that is substantially equal to or less than the concentration of salt in the fresh wash water stream 180, can be flowed to mix with the crude oil stream 101 before flowing the mixture of the crude oil stream 101 and the fresh wash water stream 180 to the desalter 120. As shown in FIG. 1A, the processed effluent 109 from the processing unit 140 can mix with the fresh wash water stream 180, which mixes with the crude oil stream 101 before flowing to the desalter 120. The desalting systems 100B and 100C (shown in FIGS. 1B and 1C, respectively) are substantially the same as the desalting system 100A, but differ in where the processed effluent 109 mixes with the crude oil stream 101. Referring to FIG. 1B, the processed effluent 109 can mix with the crude oil stream 101 at the same point where the fresh wash water stream 180 mixes with the crude oil stream 101. Referring to FIG. 1C, the processed effluent 109 can mix with the crude oil stream 101 downstream of the point where the fresh wash water stream 180 mixes with the crude oil stream 101. In some implementations (not shown), the processed effluent 109 can mix with the crude oil stream 101 upstream of the point where the fresh wash water stream 180 mixes with the crude oil stream 101. The processed effluent 109 can be mixed at various points in the system (as shown in FIGS. 1A, 1B, and 1C), but if the processed effluent 109 is mixed with the fresh wash water stream 180 before mixing with the crude oil stream 101, the salinity of the mixture of the fresh wash water stream 180 and the processed effluent 109 can be monitored and controlled by adjusting the flow of the fresh wash water stream 180.

Figure 1D:
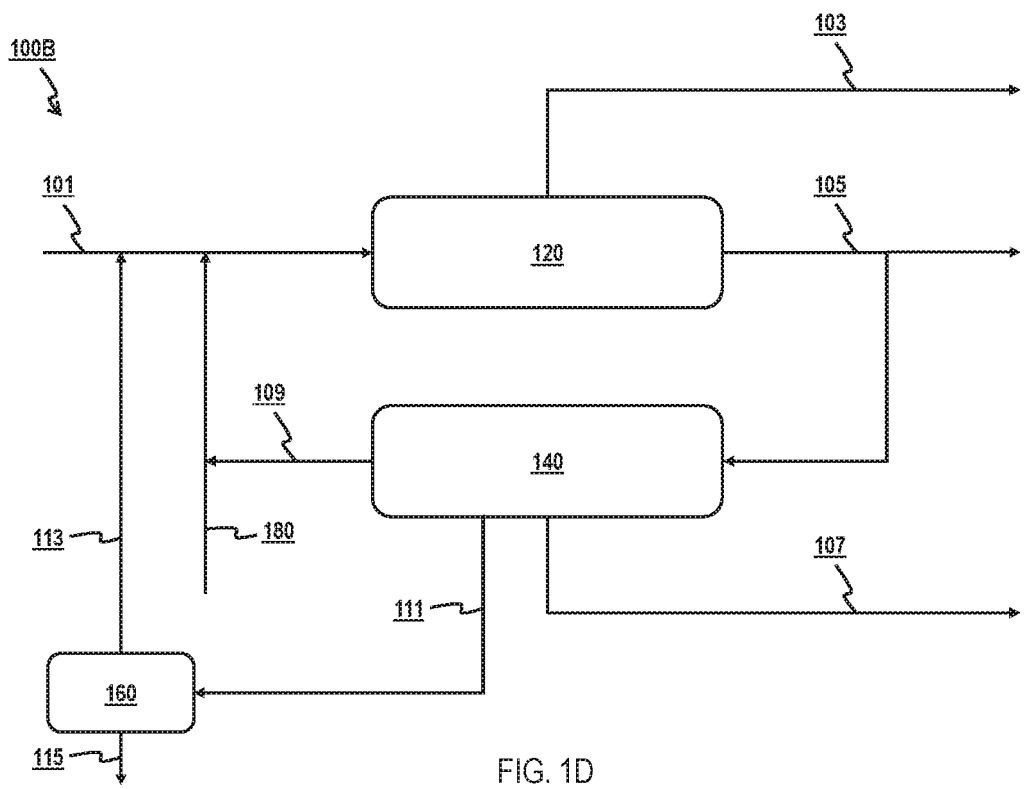
FIG. 1D is a diagram of an example of the crude oil desalting system of FIG. 1A, including an additional separator.

In certain implementations (as shown in FIG. 1D), the processing unit 140 removes a portion of suspended solids and crude oil from the desalter effluent 105. To do so, for example, the removed crude oil and suspended solids 111 can flow to a gravity separator 160, which separates the removed crude oil from a remainder of the flow, which can include solids. The removed crude oil 113 can be mixed with the crude oil stream 101 and recycled back as feed to the desalter 120. The solids 115 out of the gravity separator 160 can be analyzed or disposed. In certain implementations, a portion of the desalter effluent 105 can flow to a wastewater treatment unit (not shown). For example, in the case that the processing unit 140 needs to operate at a reduced rate for any reason, the remaining portion of the effluent, which is not handled by the processing unit 140, can be sent to a wastewater treatment unit.

Figure 1E:
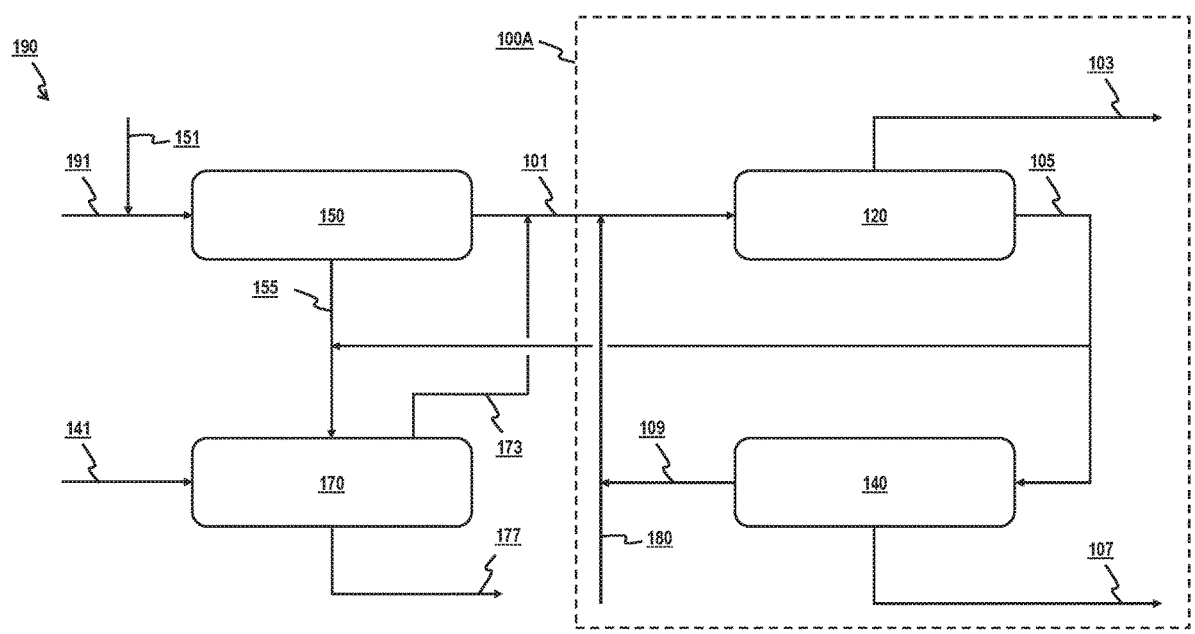
FIG. 1E is a diagram of an example of a crude oil processing system which includes the crude oil desalting system of FIG. 1A.

FIG. 1E shows a desalting system 190, which includes the desalting system 100A (shown in FIG. 1A). The desalting system 190 includes (in addition to the components in the desalting system 100A) a dehydrator 150 and a deoiling separator 170. The desalting system 190 can be described as a two-stage desalting process, with the dehydrator 150 as the first stage and the desalter 120 as the second stage. Raw crude oil 191 can mix with a demulsifier 151 before entering the dehydrator 150. The demulsifier 151 is any emulsion breaking chemical (or a combination of chemicals) to assist oil-water separation. In the dehydrator 150 a large portion of the brine dispersed in the raw crude oil 191 is separated from the crude oil. The crude oil exiting the dehydrator 150 is the crude oil stream 101, which includes the remaining emulsified brine can be sent to the desalter 120 for salt dilution and further removal of brine.

The brine exiting the dehydrator 150 is the dehydrator effluent 155 and may carry a small amount of crude oil, so the dehydrator effluent 155 can be sent to the deoiling separator 170 for additional oil-water separation. A portion of the desalter effluent 105 can also be sent to the deoiling separator 170. As shown in FIG. 1E, the portion of the desalter effluent 105 can optionally be mixed with the dehydrator effluent 155 before flowing into the deoiling separator 170. In some cases, the gravity separator 160 (in FIG. 1D) is the same as the deoiling separator 170 in FIG. 1E. In certain implementations, produced water 141 from upstream processes (such as water produced from a well) flows to the deoiling separator 170. The dehydrated crude oil 173 exiting the deoiling separator 170 can be mixed with the crude oil stream 101 before flowing into the desalter 120. The brine 177 exiting the deoiling separator 170 can, for example, be disposed, treated for use in other processes, or re-injected below the surface (similar to the brine stream 107 from the processing unit 140). The processing unit 140 can process the desalter effluent 105, the dehydrator effluent 155, or both.

Figure 2:
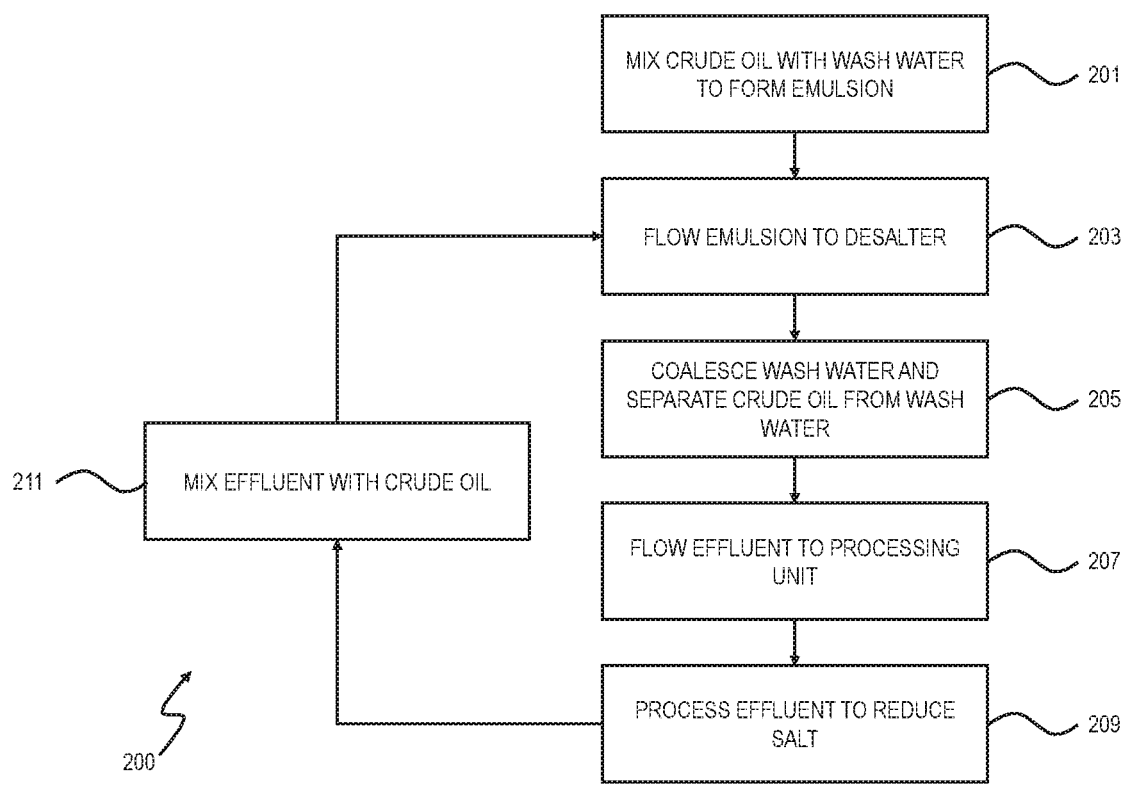
FIG. 2 is a flow chart of an example of a method for desalting crude oil, according to the disclosure.

FIG. 2 shows a flow chart of a method 200 for desalting crude oil. At 201, a crude oil stream which includes salt is mixed with a wash water stream. In certain implementations, the mixture of the crude oil stream and the wash water stream forms an emulsion of wash water in crude oil. In certain implementations, mixing the crude oil stream with the wash water stream includes flowing the crude oil stream in a crude oil flowline to the desalter and flowing the wash water stream in a wash water flowline to the crude oil flowline before the desalter. Mixing the two streams together can include any mixing technique, such as utilizing a mixing valve, utilizing baffles, utilizing an inline mixer, or any combination of techniques. The mixing can be sufficiently high to cause a desired level of contact between the wash water and the brine in the crude oil (and other contaminants, such as sand or sediment particles in the oil). The mixing can also be low enough to avoid the formation of a stable emulsion. As one example, mixing of the two streams can be regulated by controlling a pressure drop across a double-ported globe valve. The mixing energy imparted to the fluid as the fluid travels across the valve can cause the wash water to contact the brine droplets dispersed in the crude oil. Increasing the pressure drop across the valve can cause the formation of smaller water droplets.

Wash water addition to the crude oil can increase the water concentration in the crude oil, and the mixing of the streams can promote contact of wash water with the existing brine droplets (that is, water droplets with dissolved salts) in the crude oil and can also promote coalescence to form larger, more easily separated droplets with reduced salt concentration. Insufficient amounts of wash water introduction can lead to poor contact with the brine droplets in the crude oil, can reduce the dilution effect of the salt concentration in any entrained water from the desalter, and can poorly impact desalter performance (for example, the effectiveness of an applied electric field for promoting coalescence can be reduced because the water droplets are too far apart within the desalter). In cases where suitable wash water supply is inadequate, a portion of the effluent brine from the desalter can be recycled to supplement the fresh water available for desalter operation.

At 203, the mixture of the crude oil stream and the wash water stream is flowed to a desalter. In certain implementations, the mixture of the crude oil stream and the wash water stream is an emulsion of wash water in crude oil, which is flowed to the desalter.

At 205, the wash water is coalesced in the desalter to transfer at least a portion of the salt from the crude oil stream to the wash water stream. As mentioned, the crude oil stream can include salts dissolved in water droplets dispersed in the crude oil stream. Introduction of wash water and coalescence of the water droplets can cause the water (along with the dissolved salt) to amass into larger droplets that can be more easily separated from the crude oil stream. In certain implementations, where crystalline salt is present in the crude oil, at least a portion of the salt in the crude oil stream is dissolved using the wash water stream. In the desalter, the crude oil stream with reduced salt content is also separated from the wash water stream, which includes the portion of salt from the crude oil stream.

At 207, an effluent (which includes the wash water stream with the portion of salt from the crude oil stream) from the desalter is flowed to a processing unit. In certain implementations, a portion of the effluent is flowed to the processing unit, and a remaining portion of the effluent is flowed to a wastewater treatment unit.

At 209, the effluent is processed in the processing unit to reduce a concentration of salt in the effluent to be substantially equal to or less than a concentration of salt in the wash water stream. Processing the effluent can include desalinating the effluent to reduce the concentration of salt in the effluent by performing reverse osmosis or an evaporation and condensation process on the effluent. In certain implementations, the reverse osmosis can be performed at a temperature up to substantially 60° C. Performing reverse osmosis on the effluent can reduce the salt concentration of the effluent down to substantially 1,500 to 2,000 ppm. In certain implementations, performing reverse osmosis on the effluent can reduce the salt concentration of the effluent down to substantially 500 ppm or less. In some cases, reverse osmosis can be performed on a portion of the effluent, while a remaining portion of the effluent bypasses the reverse osmosis process. In such cases, the portions can be mixed to form an effluent stream with a salt concentration of substantially 1,500 to 2,000 ppm. In some cases, the effluent is oily (that is, the effluent includes some crude oil). In such cases, processing the effluent includes deoiling the effluent to remove at least a portion of the crude oil from the effluent.

In certain implementations, the effluent is processed further to remove any crude oil and suspended solids that may be carried with the effluent from the desalter. The effluent processing can include flowing the effluent to a gravity or cyclonic separator, an induced gas floatation tank, a membrane-based ultrafiltration unit, or a combination of these and separating a portion of the crude oil from a remainder of the effluent (in the mentioned equipment) to remove at least a portion of the crude oil and at least a portion of the suspended solids from the effluent. The ultrafiltration can include the use of a ceramic membrane, nut shell filter, or both. In certain implementations, ultrafiltration can reduce oil content in the effluent to substantially 1 to 5 milligrams per liter (mg/L). Ultrafiltration can also reduce the suspended solids content in the effluent to substantially 3 to 5 mg/L total suspended solids (TSS). Consequently, by nature of removing contaminants such as solids, ultrafiltration can reduce turbidity of the effluent to substantially 1 to 3 nephelometric turbidity units (NTU). In some cases (as shown in FIG. 1D), at least a portion of removed crude oil in the effluent is flowed to a gravity separator, where the removed crude oil is separated from a remainder of the effluent that was sent to the gravity separator. The separated portion of the crude oil can be mixed with the crude oil stream before flowing the emulsion to the desalter (as recycled crude oil feed). The remainder of the effluent can contain contaminants such as solids, which can be disposed.

In certain implementations, the effluent includes dissolved acid gas (such as hydrogen sulfide, $H_2S$) is processed further to remove at least a portion of the dissolved acid gas that may exist in the effluent. The effluent deoiling can include stripping the effluent in the processing unit to remove dissolved acid gas. In some cases, an acidic solution (such as sulfuric acid or hydrochloric acid) can be mixed with the effluent to lower the pH of the effluent in order to facilitate the removal of $H_2S$. In certain implementations, stripping the effluent can reduce $H_2S$ content in the effluent down to substantially 0.2 ppm.

In certain implementations, the effluent includes dissolved organics and is processed further to remove organics that may be dissolved in the effluent from the desalter. The effluent deoiling can include adsorbing at least a portion of the dissolved organics from the effluent on a macro-porous resin in the processing unit. The macro-porous resin can be a strong base anion resin with a porous structure to capture organic species from the effluent. For example, the resin can be manufactured using polystyrenic or polyacrylic polymers. In certain implementations, adsorbing the effluent with the macro-porous resin can remove substantially 60% to 80% of the dissolved organics originally in the effluent from the desalter. In some cases, the dissolved organics are adsorbed on the macro-porous resin at a temperature up to substantially 60° C.

The various processes that can be used to process the effluent from the desalter can be performed in any order in the processing unit. There may be benefits, however, of performing the various processes in an order that takes into consideration the downstream processes. For example, $H_2S$ stripping can be performed before reverse osmosis in order to mitigate the chances of oxidized $H_2S$ fouling the reverse osmosis membranes. As another example, ultrafiltration can be performed before any of the other processes in order to mitigate the chances of clogging equipment in the downstream processes.

Besides reverse osmosis, various other processes can optionally be utilized to desalinate the desalter effluent after the desalter effluent has been deoiled, such as fresh water extraction by using carrier gas or dynamic vapor recompression evaporation. Fresh water extraction by using carrier gas is an evaporative process which utilizes carrier gas in contrast to pure vapor distillation to evaporate and condense a water stream and can include two main unit operations: a humidifier and a dehumidifier. Water treated by this fresh water extraction with carrier gas can have a low level of TDS, for example, 100 ppm. Dynamic vapor recompression evaporation is a process in which the major heating source is vapor. The vapor is compressed and then condensed, for example, in a plate heat exchanger. On the other side of the plate heat exchanger, the water that is being treated uses the energy released from the condensation in order to evaporate. In other words, the heat in the dynamic vapor recompression evaporation process is reused. A large evaporation area and high recirculation flow can result in a high rate of evaporation without boiling (that is, a bulk phase change from liquid to vapor).

At 211, a portion of the processed effluent is mixed with the crude oil stream before flowing the mixture of the crude oil stream and the wash water stream to the desalter. In other words, the processed effluent is recycled to the desalter to be utilized as wash water. Because the processed effluent is recycled, the amount of fresh or make-up wash water utilized can be reduced. In the case that the processed effluent has a salt concentration that is substantially equal to the salt concentration of the wash water, the amount of processed effluent can equally replace the same amount of wash water. In the case that the processed effluent has a salt concentration that is less than the salt concentration of the wash water, the amount of wash water usage can be reduced further.

In certain implementations, mixing the portion of the processed effluent with the crude oil stream includes flowing an effluent stream from the processing unit to the wash water flowline before mixing the crude oil stream with the wash water stream. In some implementations, mixing the portion of the processed effluent with the crude oil stream includes flowing an effluent stream from the processing unit to the crude oil flowline before the desalter.

Figure 3:
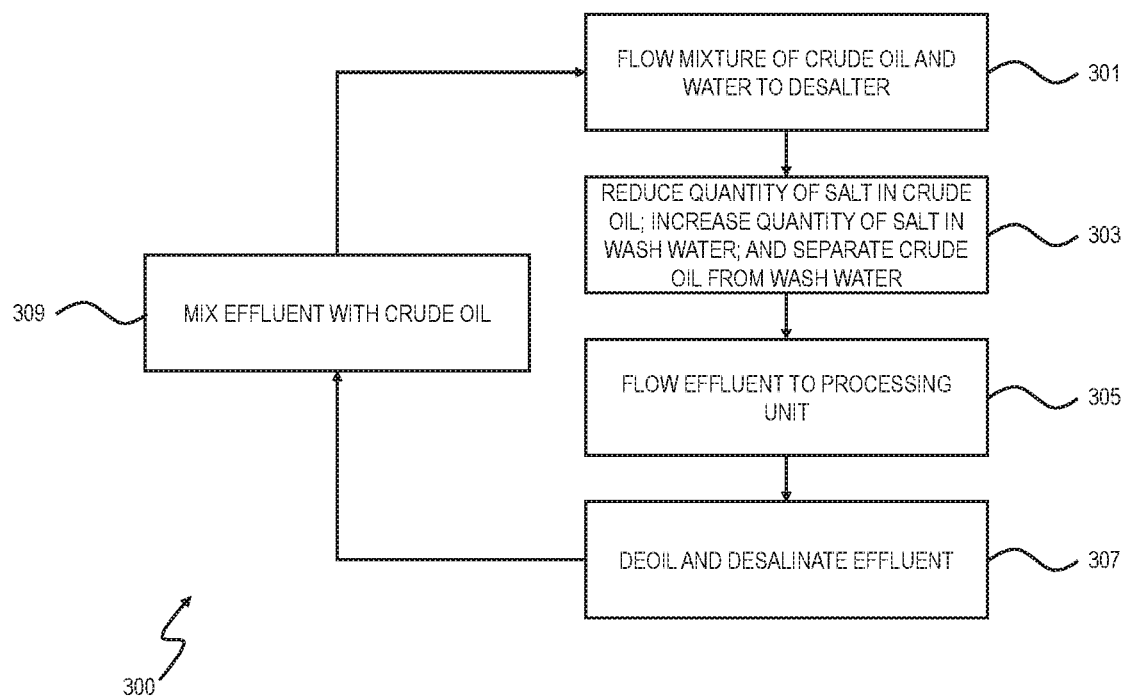
FIG. 3 is a flow chart of an example of a method for desalting crude oil, according to the disclosure.

FIG. 3 shows a flow chart of a method 300 for desalting crude oil. At 301, a mixture of a crude oil stream (which includes salt) and a wash water stream is flowed to a desalter. The mixture of crude oil and wash water can be in the form of an emulsion of wash water droplets in crude oil, which is flowed to the desalter.

At 303, in the desalter, a quantity of salt in the crude oil stream is reduced, a quantity of salt in the wash water stream is increased, and the crude oil stream with reduced salt content is separated from the wash water stream with increased salt content. The water droplets in the mixture can coalesce in the desalter, and the crude oil and wash water can form into separate phases. The crude oil stream can originally contain salt in dissolved form in droplets of water dispersed in the crude oil stream. As the droplets of water combine with the wash water, salt is transferred from the crude oil to the wash water. The water (that is, wash water with dissolved salt) can amass into a separate phase, and the wash water stream can be separated from the crude oil stream in the desalter.

At 305, an effluent, which includes the wash water stream with increased salt content, is flowed to a processing unit. The effluent from the desalter can include various contaminants, such as entrained crude oil, suspended solids, dissolved organics, and dissolved acid gases like $H_2S$.

At 307, in the processing unit, the effluent is deoiled to remove at least a portion of crude oil from the effluent, and then the effluent is desalinated to reduce a quantity of salt in the effluent. In certain implementations, deoiling the effluent can include separation, ultrafiltration, induced gas floatation, or a combination of these to remove at least a portion of the crude oil and suspended solids from the effluent. Deoiling the effluent can include stripping to remove at least a portion of the dissolved acid gas in the effluent. Deoiling the effluent can include adsorbing at least a portion of the dissolved organics from the effluent on a macro-porous resin. After deoiling, the effluent is desalinated to reduce a quantity of salt in the effluent. Desalinating the effluent can include reverse osmosis or an evaporation and condensation process. The various processes (such as ultrafiltration, stripping, adsorption, reverse osmosis) have been described previously for method 200 and are substantially the same for method 300. Similar to method 200, the removed portion of the crude oil from the effluent can be mixed with the crude oil stream as recycled crude oil feed before mixing the crude oil stream with the wash water stream, while the remaining portion can contain contaminants such as solids, which can be disposed.

At 309, a portion of the processed effluent from the processing unit is mixed with the crude oil stream before flowing the mixture of the crude oil stream and the wash water stream to the desalter. In other words, the processed effluent is recycled to the desalter to be utilized as wash water. In certain implementations, mixing the portion of the processed effluent from the processing unit with the crude oil stream before flowing the mixture of the crude oil stream and the wash water stream to the desalter includes flowing an effluent stream from the processing unit to the wash water flowline before the crude oil flowline. In some implementations, mixing the portion of the processed effluent from the processing unit with the crude oil stream before flowing the mixture of the crude oil stream and the wash water stream to the desalter includes flowing an effluent stream from the processing unit to the crude oil flowline before the desalter.

As described in this disclosure, process streams (also referred to as streams) are flowed within and between units in a crude oil processing plant. The process streams can be flowed using one or more flow control systems implemented throughout the crude oil processing plant. A flow control system can include one or more flow pumps to pump the process streams, one or more flow pipes through which the process streams are flowed, and one or more valves to regulate the flow of streams through the pipes.

In some implementations, a flow control system can be operated manually. For example, an operator can set a flow rate for each pump by changing the position of a valve (open, partially open, or closed) to regulate the flow of the process streams through the pipes in the flow control system. Once the operator has set the flow rates and the valve positions for all flow control systems distributed across the crude oil processing plant, the flow control system can flow the streams within a unit or between units under constant flow conditions, for example, constant volumetric rate or other flow conditions. To change the flow conditions, the operator can manually operate the flow control system, for example, by changing the valve position.

In some implementations, a flow control system can be operated automatically. For example, the flow control system can be connected to a computer system to operate the flow control system. The computer system can include a computer-readable medium storing instructions (such as flow control instructions and other instructions) executable by one or more processors to perform operations (such as flow control operations). For example, an operator can set the flow rates by setting the valve positions for all flow control systems distributed across the crude oil processing plant using the computer system. In such implementations, the operator can manually change the flow conditions by providing inputs through the computer system. In such implementations, the computer system can automatically (that is, without manual intervention) control one or more of the flow control systems, for example, by using feedback systems implemented in one or more units and connected to the computer system. For example, a sensor (such as a pressure sensor, temperature sensor, or other sensor) can be connected to a pipe through which a process stream flows. The sensor can monitor and provide a flow condition (such as pressure, temperature, or other flow condition) of the process stream to the computer system. In response to the flow condition deviating from a set point (such as a target pressure value, a target temperature value, or other target value) or exceeding a threshold (such as a threshold pressure value, a threshold temperature value, or other threshold value), the computer system can automatically perform operations. For example, if the pressure or temperature in the pipe exceeds the threshold pressure value or the threshold temperature value, respectively, the computer can provide a signal to open a valve to relieve pressure, a signal to shut down process stream flow, or other signals.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example implementations do not define or constrain this disclosure. Other changes, substitutions, and alterations are also possible without departing from the spirit and scope of this disclosure.

What is claimed is:

1. A method comprising:
    mixing a crude oil stream comprising salt with a wash water stream to form an emulsion of wash water in crude oil;
    flowing the emulsion to a desalter;
    in the desalter:
        coalescing the wash water to reform the wash water stream and to transfer at least a portion of the salt from the crude oil stream to the wash water stream, and
        separating the crude oil stream with reduced salt content from the wash water stream to which at least the portion of the salt is transferred;
    flowing an effluent comprising the wash water stream, to which at least the portion of the salt is transferred, from the desalter to a processing unit;
    in the processing unit, processing the effluent to reduce a concentration of salt in the effluent to be substantially less than a concentration of salt in the wash water stream; and
    mixing at least a portion of the processed effluent with the crude oil stream before flowing the emulsion to the desalter.

2. The method of claim 1, wherein mixing the crude oil stream with the wash water stream comprises:
    flowing the crude oil stream in a crude oil flowline to the desalter; and
    flowing the wash water stream in a wash water flowline to the crude oil flowline before the desalter.

3. The method of claim 2, wherein mixing at least the portion of the processed effluent with the crude oil stream comprises flowing an effluent stream from the processing unit to the crude oil flowline before the desalter.

4. The method of claim 2, wherein mixing at least the portion of the processed effluent with the crude oil stream comprises flowing an effluent stream from the processing unit to the wash water flowline before mixing the crude oil stream with the wash water stream.

5. The method of claim 2, wherein the effluent comprises crude oil, and processing the effluent comprises:
    deoiling the effluent to remove at least a portion of the crude oil from the effluent; and
    desalinating the effluent to reduce the concentration of salt in the effluent.

6. The method of claim 5, wherein desalinating the effluent to reduce the concentration of salt in the effluent comprises performing reverse osmosis or an evaporation and condensation process on the effluent.

7. The method of claim 6, wherein the reverse osmosis is performed at a temperature of up to substantially 60° C.

8. The method of claim 5, wherein deoiling the effluent to remove at least the portion of the crude oil from the effluent comprises:
flowing the effluent to a gravity separator, a cyclone separator, an induced gas floatation tank, an ultrafiltration unit, or a combination thereof;
separating at least the portion of the crude oil in the effluent from a remainder of the effluent; and
mixing the separated portion of the crude oil with the crude oil stream before flowing the emulsion to the desalter.

9. The method of claim 8, wherein the effluent comprises dissolved acid gas, and deoiling the effluent comprises stripping the effluent to remove at least a portion of the dissolved acid gas.

10. The method of claim 8, wherein the effluent comprises dissolved organics, and deoiling the effluent comprises adsorbing at least a portion of the dissolved organics from the effluent on a macro-porous resin.

11. The method of claim 10, wherein at least the portion of the dissolved organics are adsorbed on the macro-porous resin at a temperature of substantially 60° C.

12. A method comprising:
flowing a mixture of a crude oil stream comprising salt and a wash water stream to a desalter;
in the desalter:
reducing a quantity of salt in the crude oil stream,
increasing a quantity of salt in the wash water stream, and
separating the crude oil stream with reduced salt content from the wash water stream with increased salt content;
flowing an effluent comprising the wash water stream with increased salt content to a processing unit;
in the processing unit:
deoiling the effluent to remove at least a portion of crude oil from the effluent, and
after the deoiling, desalinating the effluent to reduce a quantity of salt in the effluent, such that a concentration of salt in the effluent is substantially less than a concentration of salt in the wash water stream; and
mixing at least a portion of the processed effluent from the processing unit with the crude oil stream before flowing the mixture of the crude oil stream and the wash water stream to the desalter.

13. The method of claim 12, further comprising mixing the crude oil stream with the wash water stream before flowing the mixture of the crude oil stream and the wash water stream to the desalter.

14. The method of claim 13, wherein mixing the crude oil stream with the wash water stream comprises:
flowing the crude oil stream in a crude oil flowline to the desalter; and
flowing the wash water stream in a wash water flowline to the crude oil flowline before the desalter.

15. The method of claim 14, wherein mixing at least the portion of the processed effluent from the processing unit with the crude oil stream comprises flowing an effluent stream from the processing unit to the wash water flowline before mixing the crude oil stream with the wash water stream.

16. The method of claim 14, wherein mixing at least the portion of the processed effluent from the processing unit with the crude oil stream comprises flowing an effluent stream from the processing unit to the crude oil flowline before the desalter.

17. The method of claim 14, wherein the effluent comprises crude oil, suspended solids, hydrogen sulfide, and dissolved organics, and deoiling the effluent comprises:
ultrafiltering, separation, induced gas floatation, or a combination thereof to remove at least a portion of the crude oil and at least a portion of the suspended solids from the effluent;
stripping the effluent to remove at least a portion of the dissolved hydrogen sulfide from the effluent; and
adsorbing at least a portion of the dissolved organics from the effluent on a macro-porous resin.

18. The method of claim 17, further comprising mixing the removed portion of the crude oil from the effluent with the crude oil stream before mixing the crude oil stream with the wash water stream.

19. The method of claim 14, wherein desalinating the effluent comprises performing reverse osmosis or an evaporation and condensation process on the effluent.

20. The method of claim 19, wherein the reverse osmosis is performed at a temperature of substantially 60° C.

* * * * *